United States Patent [19]

Asano et al.

[11] Patent Number: 5,710,212
[45] Date of Patent: Jan. 20, 1998

[54] THERMOPLASTIC RESIN COMPOSITION

[75] Inventors: Yukihiko Asano, Sodegaura; Kazuhiro Doi, Ube, both of Japan

[73] Assignee: Ube Industries, Ltd., Ube, Japan

[21] Appl. No.: 671,196

[22] Filed: Jun. 27, 1996

[30] Foreign Application Priority Data

Jun. 28, 1995 [JP] Japan .................................. 7-162194
Jul. 18, 1995 [JP] Japan .................................. 7-181793

[51] Int. Cl.$^6$ .................... C08L 23/12; C08L 25/10
[52] U.S. Cl. .................... 525/63; 525/92 B; 525/92 C; 525/89; 525/133; 525/905
[58] Field of Search ..................... 525/92 B, 92 C, 525/133, 63, 89, 905

[56] References Cited

U.S. PATENT DOCUMENTS

| | | | |
|---|---|---|---|
| 3,379,792 | 4/1968 | Finholt | 525/397 |
| 4,743,651 | 5/1988 | Shibuya et al. | 525/92 |
| 4,859,739 | 8/1989 | Yates, III et al. | 525/92 |
| 4,873,276 | 10/1989 | Fujii et al. | 524/153 |
| 4,972,021 | 11/1990 | Lee, Jr. | 525/132 |
| 5,091,473 | 2/1992 | Arashiro et al. | 525/92 |
| 5,109,065 | 4/1992 | Saito et al. | 525/66 |
| 5,120,801 | 6/1992 | Chambers | 525/397 |
| 5,147,942 | 9/1992 | Abe et al. | 525/397 |
| 5,262,480 | 11/1993 | Lee, Jr. | 525/92 |
| 5,338,796 | 8/1994 | Vianello et al. | 525/66 |
| 5,424,360 | 6/1995 | Nagaoka et al. | 525/66 |

FOREIGN PATENT DOCUMENTS

| | | |
|---|---|---|
| 60-137961 A | 7/1985 | Japan . |
| 2-656 | 1/1990 | Japan . |
| 2-284955 | 11/1990 | Japan . |
| 2-305854 | 12/1990 | Japan . |
| 7-184436 | 7/1994 | Japan . |

*Primary Examiner*—Ana Woodward
*Attorney, Agent, or Firm*—Armstrong, Westerman, Hattori, McLeland & Naughton

[57] ABSTRACT

A thermoplastic resin composition includes 40–75 parts by weight of a polyamide resin (A), 5–30 parts by weight of a modified polyphenylene ether (B) which is a polyphenylene ether modified with an $\beta$, $\beta$-unsaturated carboxylic acid or a derivative thereof, 1–30 parts by weight of an aromatic vinyl compound-aliphatic hydrocarbon copolymer (C), and 1–30 parts by weight of an ethylene-$\alpha$-olefin copolymer (D) or a polypropylene resin (E) with the total amount of the components (A), (B), (C), and (D) or (E) being 100 parts by weight. The polyamide resin (A) is present as a matrix phase and the other components (B), (C), and (D) or (E) are present as a disperse phase consisting of core-shell structure grains, in each of which grains the modified polyphenylene ether (B) forms a shell phase, the aromatic vinyl compound-aliphatic hydrocarbon copolymer (C) forms an intermediate phase and the ethylene-$\alpha$-olefin copolymer(D) or the polypropylene resin (E) forms a core phase.

9 Claims, 2 Drawing Sheets

THERMOPLASTIC RESIN COMPOSITION

BACKGROUND OF THE INVENTION AND RELATED ART STATEMENT

The present invention relates to a thermoplastic resin composition which is excellent in mechanical properties, solvent resistance, water absorption and dimensional stability and which has a low specific gravity (lightweightness) and good moldability. The thermoplastic resin composition of the present invention finds wide applications in electric or electronic parts, automobile parts, mechanical parts, etc.

Polyaryl ethers, particularly polyphenylene ethers are known as an engineering plastic having excellent heat resistance and are useful as a polymer material. However, the polyphenylene ethers are also well known to have problems such as very low impact resistance, solvent resistance and processability when used alone.

Hence, active studies were made to blend a polyaryl ether with at least another resin component to develop a resin composition in which the excellent properties of each component resin are utilized, and a number of resin compositions were proposed.

For example, Japanese Patent Publication No. 997/1970 and Japanese Patent Application Kokai (Laid-Open) No. 270654/1987 disclose polyphenylene ether/polyamide resin compositions. These compositions are in use mainly as an exterior trim part for automobile. However, they cannot be molded into a thin part because they have a high melt viscosity and accordingly an inferior fluidity during molding; moreover, they have a high water absorption and, when having absorbed water, give a large dimensional change and a large reduction in elastic modulus. Hence, their improvement is needed.

Japanese Patent Application Kokai (Laid-Open) No. 284955/1990 discloses a composition comprising a polyamide resin, a polyphenylene ether and a modified polyolefin, which is excellent in solvent resistance, impact resistance and moldability. In this composition, however, the polyamide resin cannot be used in an amount of 40 parts by weight or more per 100 parts by weight of the composition to allow the composition to have low water absorption, and the composition inevitably has insufficient mechanical strengths.

Japanese Patent Application Kokai (Laid-Open) Nos. 656/1990, 305854/1990 and 184436/1994 disclose compositions each comprising a polyamide resin, a styrene elastomer-containing polyphenylene ether and a modified polyolefin, wherein the polyamide resin is present as a matrix and the other components are dispersed in the matrix. This composition, however, is inferior in (1) elastic modulus when having absorbed water and (2) balance between fluidity during molding and mechanical strengths. Therefore, improvement thereof is needed.

Japanese Patent Application Kokai (Laid-Open) No. 137961/1985 discloses a resin composition obtained by melt-kneading the following components at specific proportions:

a polyamide resin, an aromatic polymer modified with an α,β-unsaturated carboxylic acid or a derivative thereof, and an ethylene copolymer or a modified ethylene copolymer obtained by modifying an ethylene copolymer with an α, β-unsaturated carboxylic acid or a derivative thereof. This resin composition as well is insufficient in balance between fluidity during molding and mechanical strengths.

The present invention has an object of eliminating the above-mentioned problems associated with the prior art and providing a thermoplastic resin composition which has the following properties in good balance:

the mechanical strengths, heat resistance, solvent resistance and moldability possessed by a polyamide resin, the mechanical strengths, heat resistance, lightweightness, low water absorption, low warpage during molding and dimensional stability possessed by a polyaryl ether, and the lightweightness, low water absorption and impact resistance possessed by an ethylene-a-olefin copolymer or a polypropylene resin, and which shows a small reduction in elastic modulus when having absorbed water (this small reduction in elastic modulus has been impossible to achieve with conventional similar resin compositions).

SUMMARY OF THE INVENTION

The present inventors made an extensive study in order to develop a resin composition well satisfying the above object. As a result, the present inventors found out that by mixing, at specific proportions, a polyamide resin, a modified polyphenylene ether, an ethylene-α-olefin copolymer or a polypropylene resin, and an aromatic vinyl compound-aliphatic hydrocarbon copolymer having a particular chemical structure, there can be obtained a thermoplastic resin composition having the above-mentioned properties, wherein substantially the polyamide resin is contained as a matrix and the other components, i.e. the modified polyphenylene ether, the ethylene-α-olefin copolymer or polypropylene resin and the aromatic vinyl compound-aliphatic hydrocarbon copolymer are dispersed in the matrix in the form of core-shell structure grains, in each of which grains the modified polyphenylene ether forms a shell (a primary disperse phase), the aromatic vinyl compound-aliphatic hydrocarbon copolymer forms an intermediate phase and the ethylene-α-olefin copolymer or polypropylene resin forms a core (a secondary disperse phase). The present invention has been completed based on the above finding.

The present invention provides a thermoplastic resin composition comprising:

40–75 parts by weight of a polyamide resin (A),

5–30 parts by weight of a modified polyphenylene ether (B) which is a polyphenylene ether modified with an α,β-unsaturated carboxylic acid or a derivative thereof [the modified polyphenylene ether is hereinafter referred to simply as "modified polyphenylene ether"], 1–30 parts by weight of an aromatic vinyl compound-aliphatic hydrocarbon copolymer (C), and 1–30 parts by weight of an ethylene-α-olefin copolymer (D) or a polypropylene resin (E) with the total amount of the components (A), (B), (C), and (D) or (E) being 100 parts by weight, wherein substantially the component (A) is present as a matrix phase and the other components (B), (C), and (D) or (E) are present as a disperse phase consisting of core-shell structure grains, in each of which grains the modified polyphenylene ether (B) forms a shell phase, the aromatic vinyl compound-aliphatic hydrocarbon copolymer (C) forms an intermediate phase and the ethylene-α-olefin copolymer (D) or the polypropylene resin (E) forms a core phase.

In the present composition, the aromatic vinyl compound-aliphatic hydrocarbon copolymer (C) is preferably a hydrogenated or non-hydrogenated styrene-butadiene copolymer or a hydrogenated or non-hydrogenated styrene-isoprene copolymer.

The present thermoplastic resin composition has a big feature in that in the composition, the polyamide resin (A) is present as a matrix phase (a continuous phase) and the other components (B), (C), and (D) or (E) are dispersed in the matrix phase in the form of core-shell structure complex grains each consisting of the modified polyphenylene ether (B) as a shell phase (a primary disperse phase), the aromatic vinyl compound-aliphatic hydrocarbon copolymer (C) as an compatibilizer (an intermediate phase), and the ethylene-α-olefin copolymer (D) or the polypropylene resin (E) as a core phase (a secondary disperse phase).

DETAILED DESCRIPTION OF THE INVENTION

Figure 1:
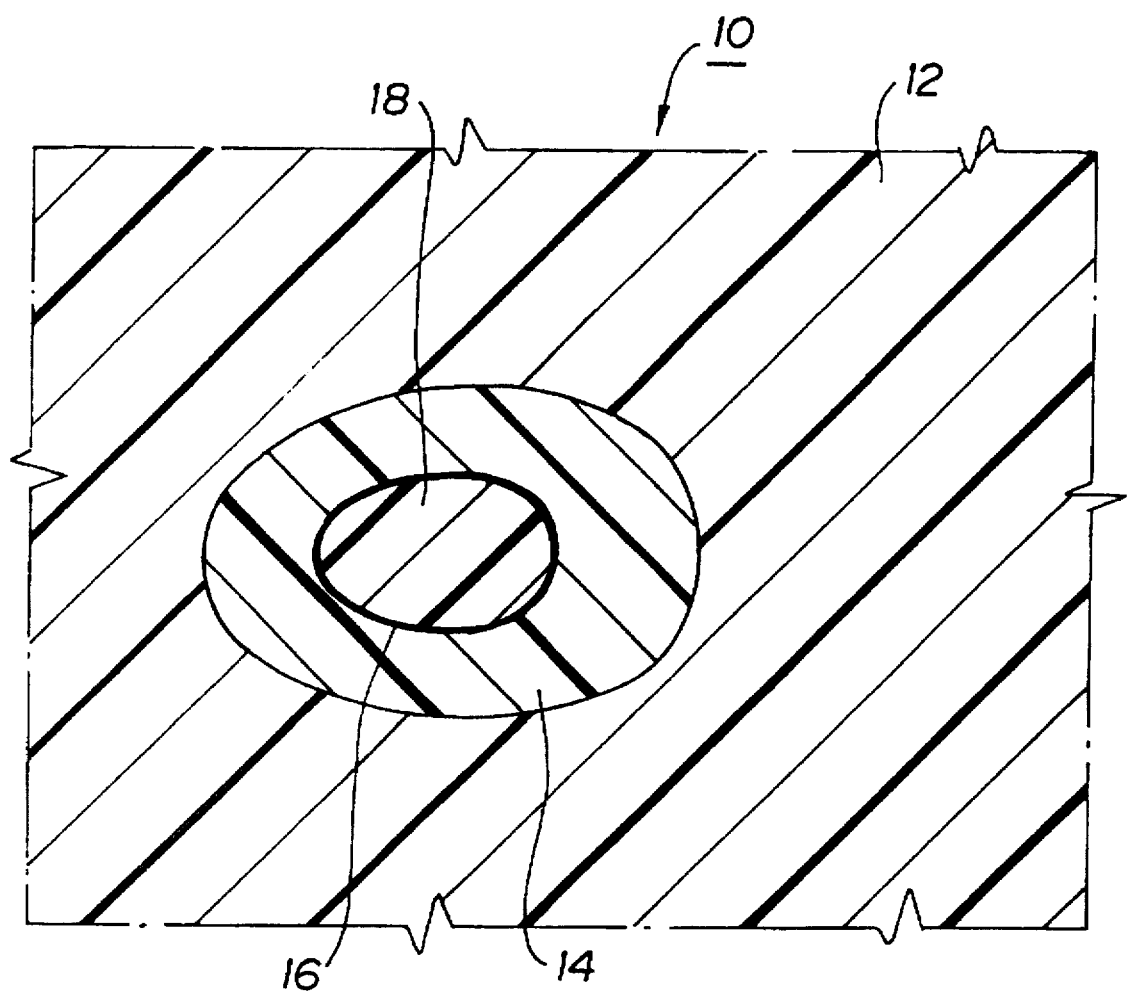
FIG. 1 is a cross section schematically showing the thermoplastic resin composition of the present invention.

In FIG. 1, the thermoplastic resin composition 10 comprises a matrix phase 12 of a polyamide resin and a primary disperse phase (a shell phase) 14 dispersed in the matrix phase 12, consisting of a large number of modified polyphenylene ether particles. In the primary disperse phase 14, an aromatic vinyl compound-aliphatic hydrocarbon copolymer as an compatibilizer forms an intermediate phase 16, and an ethylene-α-olefin copolymer or a polypropylene resin forms a secondary disperse phase (a core phase) 18 dispersed in the primary phase 14 via the intermediate phase 16.

The primary disperse phase (shell phase) 14, the intermediate phase 16 and the secondary disperse phase (core phase) 18 form core-shell structure complex grains.

Figure 2:
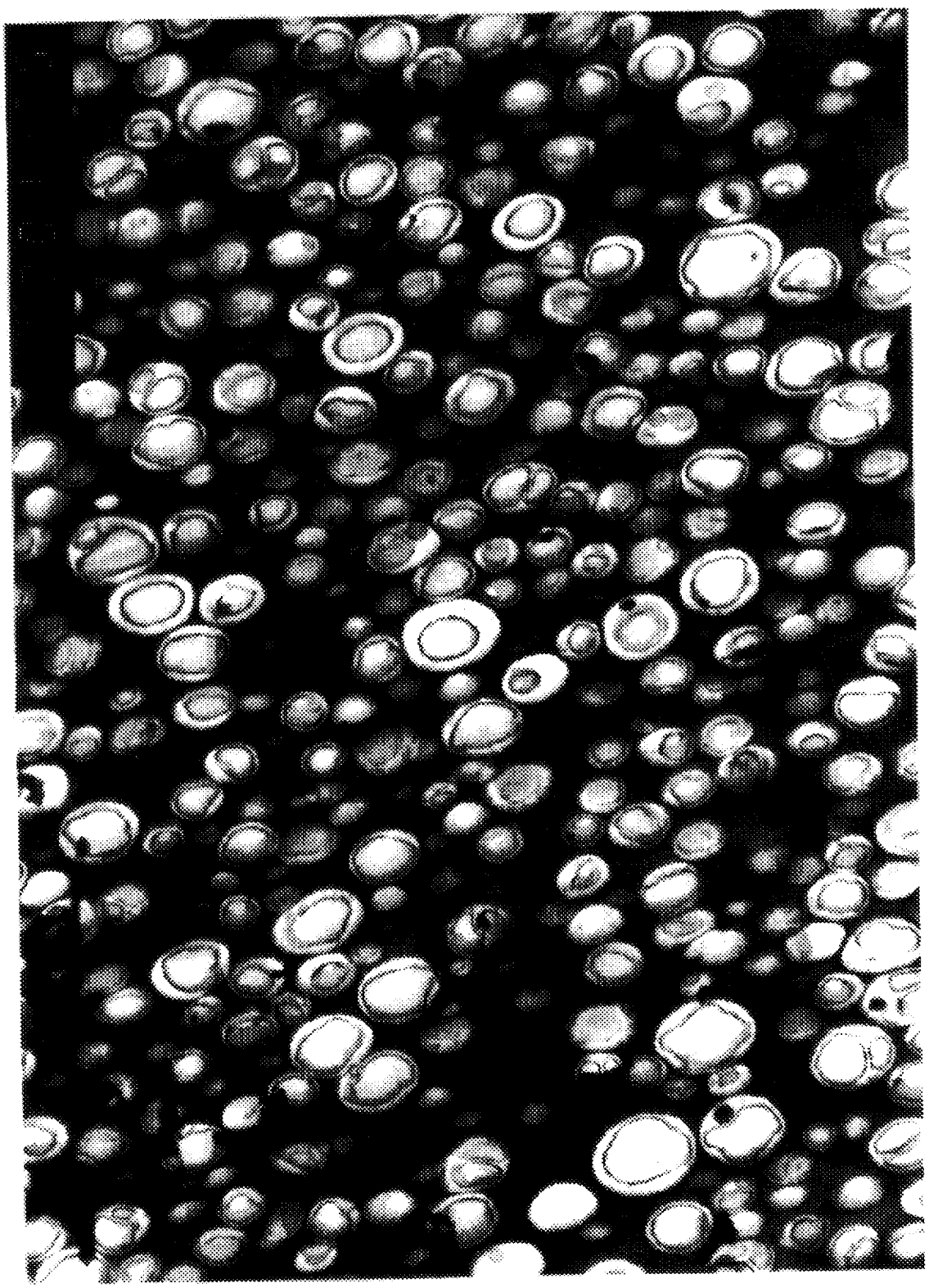
FIG. 2 is a photograph of transmission electron microscope of the thermoplastic resin composition of the present invention.

FIG. 2 is a photograph (15,000 magnification) of transmission electron microscope, of the thermoplastic resin composition of the present invention, wherein substantially all the grains are core-shell structure complex grains.

The polyamide resin (A) used in the present invention is obtained by polycondensation of diamine and dicarboxylic acid, self-condensation of ω-aminocarboxylic acid, ring-opening polymerization of lactam, or the like, and has a sufficiently large molecular weight.

Specific examples of the diamine are aliphatic, alicyclic or aromatic diamines such as tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bisaminomethylcyclohexane, 1,4-bisaminomethylcyclohexane, bis-p-aminocyclohexylmethane, p-aminocyclohexylpropane, isophoronediamine, m-xylylenediamine and p-xylylenediamine. Specific examples of the dicarboxylic acid are aliphatic, alicyclic or aromatic dicarboxylic acids such as adipic acid, suberic acid, azelaic acid, sebacic acid, dodecanedioic acid, 1,3-cyclohexanedicarboxylic acid, 1,4-cyclohexanedicarboxylic acid, terephthalic acid, isophthalic acid, naphthalenedicarboxylic acid and dimer acid. Specific examples of the ω-aminocarboxylic acid are ε-aminocaproic acid, 11-aminoundecanoic acid and 12-aminododecanoic acid. Specific examples of the lactam are ε-caprolactam, enanthlactam and ω-laurolactam.

In the present invention, the diamine, the dicarboxylic acid, the ω-aminocarboxylic acid and the lactam are each used for polycondensation or the like, singly or in admixture of two or more kinds. The resulting polyamide can be used in the form of homopolymer, copolymer or any mixture thereof.

Examples of the polyamide resin used in the present invention are nylon 6, nylon 4,6, nylon 6,6, nylon 11, nylon 12, nylon 6,10, nylon 6,12, nylon 6/6,6, nylon 6/6,12, nylon 6,MXD (MXD refers to a m-xylylenediamine component), nylon 6,T (T refers to a terephthalic acid component) and nylon 6,I (I refers to an isophthalic acid component), but are not restricted thereto. Of these polyamide resins, preferred are nylon 6, nylon 6,6, nylon 11, nylon 12, nylon 6/6,6, nylon 6,T, nylon 6,I, etc. from the standpoints of cost and balance between moldability and mechanical properties. Particularly preferred are nylon 6, nylon 6,6, their copolymers and mixtures thereof.

The polyamide resin has no particular restriction as to the number-average molecular weight, and can have any number-average molecular weight in the range of generally 10,000-50,000, particularly 13,000-30,000.

When the number-average molecular weight of the polyamide resin is smaller than 10,000, the resulting thermoplastic resin composition have inferior mechanical properties. When the number-average molecular weight is larger than 50,000, the resulting thermoplastic resin composition has a high melt viscosity and inferior moldability. Further, when the number-average molecular weight is larger than 10,000 but smaller than 13,000, or larger than 30,000 but smaller than 50,000, the resulting thermoplastic resin composition may show the above-mentioned undesirable phenomena as well.

The modified polyphenylene ether (B) used in the present invention is obtained by grafting a particular modifier (described later) into the molecular chain of a polyphenylene ether by a method mentioned later. The polyphenylene ether referred herein is a polyphenylene ether (hereinafter abbreviated to "PPE'") represented by the following general formula (I)

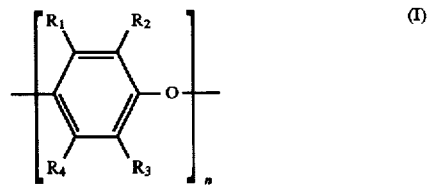

wherein $R_1$, $R_2$, $R_3$ and $R_4$ are each a monovalent substituent which is selected from hydrogen, halogens, alkyl groups, alkoxy groups, haloalkyl groups and haloalkoxy groups (the haloalkyl groups and the haloalkoxy groups each have at least two carbon atoms between the halogen atom and the phenyl ring) and which does not contain a tertiary α-carbon; $R_1$, $R_2$, $R_3$ and $R_4$ may be the same or different from each other; and n is an integer indicating the polymerization degree of the polymer. PPE may be a homopolymer or a copolymer each represented by the general formula (I).

Preferable examples of the homopolymer PPE are PPEs of the general formula (I) wherein $R_1$ and $R_4$ are each hydrogen or a $C_{1-4}$ alkyl group and $R_2$ and $R_3$ are each a $C_{1-4}$ alkyl group, and specifically are poly(2,6-dimethyl-1,4-phenylene) ether, poly(2,6-diethyl-1,4-phenylene) ether, poly(2-methyl-6-ethyl-1,4-phenylene) ether, poly(2-methyl- 6-propyl-1,4-phenylene) ether, poly(2,6-dipropyl-1,4-phenylene) ether, poly(2-ethyl-6-propyl-1,4-phenylene) ether, poly(2,3,6-trimethyl-1,4-phenylene) ether, poly(2,3,6-triethyl-1,4-phenylene) ether, poly(2,3-dimethyl-6-ethyl-1,4-phenylene) ether and poly(2,3-dimethyl-6-propyl-1,4-phenylene) ether.

As the copolymer PPE, there can be mentioned those copolymer PPEs wherein above-mentioned repeating units of an alkyl-tri-substituted phenol derivative [e.g. poly(2,3,6-trimethyl-1,4-phenylene) ether] are contained in a certain amount in the above-mentioned repeating units of an alkyl-di-substituted phenol derivative [e.g. poly(2,6-dimetyl-1,4-phenylene) ether]. There can also be used copolymer PPEs obtained by grafting a styrene compound (e.g. styrene, α-methylstyrene, vinyltoluene or chlorostyrene) onto a homopolymer PPE or a copolymer PPE. There can also be used copolymer PPEs containing a styrene polymer, which are commercially available and whose use is well known in the art.

In the present invention, of the above-mentioned homopolymer PPEs and copolymer PPEs, particularly preferred are those homopolymer PPEs of the general formula (I) wherein $R_1$ is hydrogen or a methyl group, $R_2$ and $R_3$ are each a methyl group, and $R_4$ is hydrogen, i.e. (2,6-dimethyl-1,4-phenylene) ether and poly(2,3,6-trimethyl-1,4-phenylene) ether; and copolymer PPEs wherein poly(2,3,6-trimethyl-1,4-phenylene) ether repeating units are contained in a certain amount in poly(2,6-dimethyl-1,4-phenylene) ether repeating units.

In the present invention, the PPE desirably has an intrinsic viscosity [η] of 0.2–1.0 dl/g, preferably 0.3–0.7 dl/g as measured at 25° C. in chloroform. When the intrinsic viscosity [η] is smaller than 0.2 dl/g, the resulting thermoplastic resin composition has no sufficient heat resistance. When the intrinsic viscosity is larger than 1.0 dl/g, the resulting composition has low moldability. In order to obtain a thermoplastic resin composition free from the above-mentioned undesirable phenomena, the PPE used should have an intrinsic viscosity [η] of 0.3–0.7 dl/g.

The modifier for PPE is an α,β-unsaturated carboxylic acid or a derivative thereof. Specific examples of the α,β-unsaturated carboxylic acid are monobasic unsaturated carboxylic acids such as acrylic acid, methacrylic acid, methylmethacrylic acid, crotonic acid, isocrotonic acid, furoic acid, pentenoic acid, vinylacetic acid, angelic acid and the like; dibasic unsaturated carboxylic acids such as maleic acid, chloromaleic acid, fumaric acid, tetrahydrophthalic acid, itaconic acid, citraconic acid, endocis-bicyclo[2,2,1]hept-5-ene-2,3-dicarboxylic acid [Nadic Acid (trade name)] and the like; and tribasic unsaturated carboxylic acids such as citric acid, aconitic acid and the like. The derivative of the α,β-unsaturated carboxylic acid includes derivatives of the above-mentioned monobasic, dibasic or tribasic unsaturated carboxylic acids, for example, acid halides, amides, imides, anhydrides and salts (e.g. sodium salts and zinc salts). Specific examples of these derivatives are maleyl chloride, acrylamide, maleimide, N-phenylmaleimide, N-methylmaleimide, N-ethylmaleimide, maleic anhydride, itaconic anhydride, glutaconic anhydride, citraconic anhydride, endocis-bicyclo[2,2,1]hept-5-ene-2,3-dicarboxylic acid anhydride [Nadic Anhydride (trade name)], aconitic anhydride, sodium acrylate, zinc acrylate, methyl acrylate, methyl methacrylate, monomethyl maleate, dimethyl maleate, diethyl itaconate, dibutyl citraconate, glycidyl acrylate, glycidyl methacrylate and diglycidyl maleate. Of these modifiers, preferred are acrylic acid, methacrylic acid, citric acid, maleic acid, maleic anhydride, itaconic anhydride and Nadic Anhydride with citric acid and maleic anhydride being more preferred.

The concentration of the modifier, i.e the α,β-unsaturated carboxylic acid or the derivative thereof in the modified polyphenylene ether (B) is 0.05–1.5% by weight, preferably 0.1–1.3% by weight. When the concentration of the modifier is lower than the above range, the adhesivity between the polyamide resin and the polyphenylene ether phase is insufficient and the resulting thermoplastic resin composition has an unstable structure and insufficient mechanical strengths. When the concentration is higher than the above range, no higher compatibility is obtained between the polyamide resin and the polyphenylene ether phase and the thermoplastic resin composition has low melt fluidity, resulting in impaired moldability. When the concentration is higher than 0.05% by weight but lower than 0.1% by weight, or higher than 1.3% by weight but lower than 1.5% by weight, the above-mentioned undesirable phenomena may appear.

The method for PPE modification is not particularly restricted, and there can be employed various known methods, for example, (1) a method of grafting a modifier (as mentioned above) onto PPE in a molten state, (2) a method of grafting a modifier onto PPE in a solution state, and (3) a method of grafting a modifier onto PPE in a slurry state. The method (1) can be carried out specifically by melt-kneading PPE and a modifier, i.e. an α,β-unsaturated carboxylic acid or a derivative thereof by the use of a roll mill, a Banbury mixer, an extruder or the like at 200°–350° C. for 10 seconds to 30 minutes to give rise to a graft reaction. The method (2) can be carried out specifically by dissolving PPE in a solvent such as benzene, toluene, xylene, decalin, tetralin or the like, adding to the solution a modifier, i.e. an α,β-unsaturated carboxylic acid or a derivative thereof, and heat-stirring the mixture to give rise to a graft reaction. In the present invention, the method (1) of grafting an α,β-unsaturated carboxylic acid or a derivative thereof onto PPE in a molten state by the use of an extruder is simplest and most efficient.

In the PPE modification, the grafting of modifier (α,β-unsaturated carboxylic acid or derivative thereof) onto PPE can be conducted efficiently by, as necessary, using a radical initiator such as organic peroxide, azo compound or the like.

Preferred specific examples of the organic peroxide are benzoyl peroxide, di-cumyl peroxide, di-tert-butyl peroxide, tert-butyl cumyl peroxide, cumene hydroperoxide, 2,5-dimethyl-2,5-di-(tert-butylperoxy)hexane and 2,5-dimethyl-2,5-di-(tert-butylperoxy)hexyne-3. Preferred specific examples of the azo compound are azobisisobutyronitrile and dimethyl azoisobutylate.

The radical initiator is used in an amount of preferably 5–30 parts by weight per 100 parts by weight of PPE. The kind and amount of the radical initiator used are not restricted to those mentioned above.

The modified polyphenylene ether (B) used in the present invention may be a mixture of a modified polyphenylene ether mentioned above and an unmodified polyphenylene ether, as long as the amount of the modifier in the component (B) is in the above-mentioned range.

The aromatic vinyl compound-aliphatic hydrocarbon copolymer (C) used in the present invention is a hydrogenated or non-hydrogenated styrene-butadiene copolymer or a hydrogenated or non-hydrogenated styrene-isoprene copolymer. The hydrogenated or non-hydrogenated styrene-butadiene copolymer includes a styrene-butadiene block copolymer, a hydrogenated styrene-butadiene block copolymer and a hydrogenated styrenebutadiene random copolymer. The hydrogenated or non-hydrogenated styrene-isoprene copolymer includes a styrene-isoprene block copolymer or a hydrogenated styrene-isoprene block copolymer.

The hydrogenated styrene-butadiene copolymer or the hydrogenated styrene-isoprene copolymer can be obtained by hydrogenating a styrene-butadiene copolymer or a styrene-isoprene copolymer by a method known in the related field, for example, a method disclosed in U.S. Pat. No. 3,431,323, or can be appropriately selected from commercial products.

In the present invention, the aromatic vinyl compound-aliphatic hydrocarbon copolymer (C) must have a number-average molecular weight of 20,000–250,000, preferably 30,000–200,000. When the number-average molecular weight is less than 20,000, the component (C) has insufficient compatibility with the modified polyphenylene ether (B) and, in the resulting thermoplastic resin composition, it is impossible to obtain an intended structure, i.e. core-shell structure complex grains, in each of which grains a secondary disperse phase is contained in a primary disperse phase. When the number-average molecular weight is more than 250,000, the resulting thermoplastic resin composition has inferior mechanical properties. In order to obtain a thermoplastic resin composition free from the above-mentioned undesirable phenomena, the component (C) should have a number-average molecular weight in the above-mentioned preferable range.

The ethylene-α-olefin copolymer (D) used in the present invention includes block or random copolymers between ethylene and one or more α-olefins of 3 or more carbon atoms, preferably 3–18 carbon atoms, such as propylene, 1-butene, 1-pentene, 4-methyl-1-pentene, 1-hexene, 1-octene, 1-decene, 1-dodecene, 1-tetradecene, 1-hexadecene, 1-octadecene and the like; terpolymers wherein ethylene, the above-mentioned α-olefin and a small amount of a non-conjugated diene component such as 1,4-hexadiene, dicyclopentadiene, ethylidenenorbornene or the like are randomly polymerized; and so forth.

Specific examples of the component (D) are ethylene-propylene copolymer, ethylene-1-butene copolymer, ethylene-1-hexene copolymer, ethylene-propylene-dicyclopentadiene copolymer, ethylene-propylene-1,4-hexadiene copolymer, ethylene-1-butene-dicyclopentadiene copolymer, ethylene-1-butene-1,4-hexadiene copolymer, ethylene-propylene-ethylidenenorbornene copolymer and ethylene-1-butene-ethylidenenorbornene copolymer. Of these, preferred are ethylene-propylene random copolymer and ethylene-propylene-non-conjugated diene terpolymers such as ethylene-propylene-1,4-hexadiene copolymer, ethylene-propylene-ethylidenenorbornene copolymer and the like.

In the ethylene-α-olefin copolymer (D), the ethylene content is 30–85 mole %, preferably 45–85 mole %. When the ethylene content is less than 30 mole % based on the copolymer (D), the copolymer (D) has insufficient affinity with the component (C), i.e. the aromatic vinyl compound-aliphatic hydrocarbon copolymer and the resulting thermoplastic resin composition has an unstable structure and low mechanical strengths. When the ethylene content is more than 85 mole % based on the copolymer (D), the resulting thermoplastic resin composition has low impact resistance and large shrinkage during molding and solidification and gives a molded article of low dimensional stability. In order to obtain a thermoplastic resin composition free from the above-mentioned undesirable phenomena, the ethylene content of the component (D) should be in the above-mentioned preferable range.

The ethylene-α-olefin copolymer (D) has a melt flow rate (MFR) of 0.1–60 g/10 min, preferably 0.2–50 g/10 min as measured at 230° C. under a load of 2.16 kg according to ASTM D 1238. When the MFR is smaller than 0.1 g/10 min, the resulting thermoplastic resin composition has inferior moldability. When the MFR is larger than 60 g/10 min, the melt viscosity of the component (D) is too low as compared with the melt viscosity of the polyamide resin component (A); as a result, it is difficult for the component (A) to form a continuous phase and it is impossible to obtain intended core-shell structure grains wherein a secondary disperse phase is contained in a primary disperse phase. The above-mentioned undesirable phenomena may appear even when the MFR is in the range of 0.1–0.2 g/10 min or 50–60 g/10 min.

The polypropylene resin (E) used in the present invention includes propylene homopolymer; block or random copolymers between propylene and 20 mole % or less of one or more α-olefins of at least 2 carbon atoms, particularly 2–28 carbon atoms (propylene is excluded), such as ethylene, 1-butene, 1-pentene, 4-methyl-1-pentene, 1-hexene, 1-octene, 1-decene, 1-dodecene, 1-tetradecene, 1-hexadecene, 1-octadecene and the like; and mixtures thereof. Of these, preferred are propylene homopolymer and ethylene-propylene random or block copolymer because they have high elastic moduli.

When in the block or random copolymer between propylene and one or more α-olefins, the propylene content is less than 80 mole % based on the copolymer, the resulting thermoplastic resin composition gives a molded article insufficient in flexural modulus and mechanical strengths.

The polypropylene resin (E) can be obtained by polymerizing the raw material(s) by a method known in the related field, for example, one of the methods disclosed in Encyclopedia of Polymer Science and Technology, Vol. 6, p. 275 (1967), the same literature, Vol. 11, p. 597 (1969), Angew. Chem. Int. Ed. Engl., 19, 390 (1980), Angew. Chem., 97, 507 (1985) and J. Am. Chem. Soc., 106, 6355 (1984), or can be appropriately selected from commercial products.

The molecular weight of the polypropylene resin (E) is, as a criterion, 0.3–150 g/10 min, preferably 0.6–100 g/10 min in terms of melt flow rate (hereinafter abbreviated to MFR) as measured at 230° C. under a load of 2.16 kg according to ASTM D 1238. When the MFR is smaller than 0.3 g/10 min, the resulting thermoplastic resin composition has inferior moldability. When the MFR is larger than 150 g/10 min, the melt viscosity of the polypropylene resin (E) is too low as compared with the melt viscosity of the polyamide resin (A); as a result, it is difficult for the component (A) to form a continuous phase and it is impossible to obtain core-shell structure grains wherein a secondary disperse phase is contained in a primary disperse phase. The above-mentioned undesirable phenomena may appear even when the MFR is in the range of 0.3–0.6 g/10 min or 100–150 g/10 min.

In the thermoplastic resin composition of the present invention, it is necessary that the polyamide resin (A) forms a matrix phase (a continuous phase). In the thermoplastic resin composition wherein the polyamide resin (A) forms a continuous phase, the excellent properties of the polyamide resin (A) such as mechanical properties, heat resistance, solvent resistance and the like can be utilized. When the polyamide resin (A) forms a discontinuous phase, the thermoplastic resin composition has low mechanical properties and heat resistance and it is impossible to achieve the object of the present invention.

When the polyamide resin (A) forms a matrix phase but the modified polyphenylene ether (B), the aromatic vinyl compound-aliphatic hydrocarbon copolymer (C), and the ethylene-α-olefin copolymer (D) or the polypropylene resin (E) are independently dispersed in the matrix phase, or when the component (A) forms a matrix phase but the component (B) and the component (C) form a disperse phase of salami structure [the component (B): primary disperse phase, the component (C): secondary disperse phase] and the component (D) or (E) is not contained in the primary disperse phase and is independently dispersed in the matrix, such a thermoplastic resin composition has no satisfactory mechanical properties.

Therefore, in the thermoplastic resin composition of the present invention, it is absolutely necessary that the disperse phase formed by the component (B), the component (C), and the component (D) or (E) takes a form of core-shell structure complex grains, in each of which grains the component (D) or (E) as secondary disperse phase is contained in the component (B) as primary disperse phase. Specifically, the modified polyphenylene ether (B) forms a shell phase and the aromatic vinyl compound-aliphatic hydrocarbon copolymer (C) forms an intermediate phase; thereby, the ethylene-α-olefin copolymer (D) or the polypropylene resin (E) becomes a core phase; as a result, a thermoplastic resin composition satisfying the object of the present invention can be obtained which is well balanced between (1) mechanical strengths, heat resistance, solvent resistance and fluidity during molding and (2) lightweightness, low water absorption, low warpage during molding and dimensional stability and which gives a small reduction in elastic modulus upon water absorption.

When there are used, as the components (B), (C), and (D) or (E), components each modified with a polar group having an affinity with the polyamide resin (A), or when, as seen in, for example, the thermoplastic resin composition illustrated in Japanese Patent Application Kokai (Laid-Open) No. 184436/1994, an unmodified polyphenylene ether is used as the component (B) forming a disperse phase and, in production of a thermoplastic resin composition, the above-mentioned components (A), (C), and (D) or (E) and said unmodified polyphenylene ether are melt-kneaded together with an α,β-unsaturated carboxylic acid or a derivative thereof, of an amount giving the above-mentioned concentration range, the core-shell structure complex grains intended by the present invention cannot be obtained because the components (B), (C), and (D) or (E) forming a disperse phase are independently dispersed in the matrix phase formed by the polyamide resin component (A).

In the thermoplastic resin composition of the present invention, the proportions of the components (A), (B), (C), and (D) or (E) are such that the amount of the polyamide resin component (A) is 40–75 parts by weight, preferably 40–65 parts by weight, the amount of the modified polyphenylene ether component (B) is 5–30 parts by weight, preferably 10–30 parts by weight, the amount of the aromatic vinyl compound-aliphatic hydrocarbon copolymer component (C) is 1–30 parts by weight, preferably 5–25 parts by weight and the amount of the ethylene-α-olefin copolymer component (D) or the polypropylene resin component (E) is 1–30 parts by weight, preferably 5–25 parts by weight with the total amount of the components (A), (B), (C), and (D) or (E) being 100 parts by weight.

When the amount of the component (A) is larger than 75 parts by weight, the resulting thermoplastic resin composition is insufficient in low water absorption, giving a molded article of higher dimensional change owing to higher water absorbability or showing a lower elastic modulus.

When the amount of the component (A) is smaller than 40 parts by weight, the continuity of the polyamide resin (A) phase is reduced and the resulting thermoplastic resin composition shows lower mechanical strengths, heat resistance and moldability.

When the amount of the component (B) is smaller than 5 parts by weight, the compatibility between (1) the polyamide resin component (A) and (2) the aromatic vinyl compound-aliphatic hydrocarbon copolymer component (C) and the ethylene-α-olefin copolymer component (D) or the polypropylene resin component (E) is lower; as a result, it is impossible to obtain intended core-shell structure complex grains and the resulting thermoplastic resin composition is inferior in mechanical strengths, heat resistance, low water absorption, low warpage during molding, dimensional stability, etc. When the amount of the component (B) is larger than 30 parts by weight, the resulting thermoplastic resin composition is remarkably inferior in fluidity during molding.

When the amount of the component (C) is smaller than 1 part by weight, it is impossible to form core-shell structure complex grains and it is impossible to obtain an intended thermoplastic resin composition balanced in properties. When the amount of the component (C) is larger than 30 parts by weight, the resulting thermoplastic resin composition has lower mechanical strengths and elastic modulus.

When the amount of the component (D) or (E) is smaller than 1 part by weight, the resulting thermoplastic resin composition is inferior in lightweightness, low water absorption and moldability. When the amount of the component (D) or (E) is larger than 30 parts by weight, the resulting thermoplastic resin composition has lower mechanical strengths and elastic modulus.

In order to reliably prevent the above-mentioned undesirable phenomena shown by the thermoplastic resin composition when the amounts of the components (A) to (E) deviate from the respective specified ranges mentioned above, the amounts of the components (A) to (E) should be in the respective preferable ranges mentioned above.

There is no particular restriction as to the process for producing the thermoplastic resin composition of the present invention, and the composition can be produced by various conventional processes. For example, the components (A), (B), (C), and (D) or (E) are subjected to preliminary mixing at room temperature. Subsequently, the mixture is subjected to melt kneading at a temperature at which each component sufficiently melts but at which each component does not decompose. For example, the melt-kneading temperature may be 240° C. or more, preferably 260°–320° C. When the melt-kneading temperature exceeds 320° C, the crosslinking or decomposition of resin takes place easily. In the preliminary mixing, a high-speed rotary mixer (e.g. a Henschel mixer) or a low-speed rotary mixer (e.g. a cone blender or a tumbler) may be used, both of which are used in ordinary mixing. In the melt kneading, a single-screw or double-screw extruder or an ordinary melt-kneading machine (e.g. a Banbury mixer, a kneader or a mixing roll) may be used.

The thermoplastic resin composition of the present invention may contain a reinforcing agent and a filler each having such a shape or state as fiber, powder, flake, mat or the like as long as the moldability and properties of the composition are not impaired. Specific examples of the reinforcing agent and the filler include inorganic or metallic fibers such as glass fiber, asbestos fiber, carbon fiber, silica fiber, silica-alumina fiber, alumina fiber, zirconia fiber, boron nitride fiber, silicon nitride fiber, basic magnesium sulfate fiber, boron fiber, stainless steel fiber, aluminum fiber, titanium fiber, copper fiber, brass fiber, magnesium fiber and the like; organic fibers such as polyamide fiber, polyester fiber, polyacrylonitrile fiber, cellulose and the like; powders of metals such as copper, iron, nickel, zinc, tin, lead, stainless steel, aluminum, gold, silver and the like; fumed silica; aluminum silicate; calcium silicate; silicic acid; hydrous calcium silicate; hydrous aluminum silicate; glass beads; carbon black; quartz powder; talc; mica; titanium oxide; iron oxide; zinc oxide; calcium carbonate; magnesium carbonate; magnesium oxide; calcium oxide; magnesium sulfate; potassium titanate; and diatomaceous earth. The reinforcing agent and the filler are not restricted to these.

When the reinforcing agent or the filler is a fibrous material, it preferably has an average fiber diameter of 0.1–30 μm and a fiber length/fiber diameter ratio of 10 or more. The reinforcing agent and the filler may have been subjected to a surface treatment with a known silane coupling agent or a titanate coupling agent.

The amount of the reinforcing agent and the filler used is 1–300 parts by weight, preferably 10–250 parts by weight per 100 parts by weight of the thermoplastic resin composition of the present invention. When the amount is less than 1 part by weight, no addition effect of the reinforcing agent or the filler is obtained. When the amount is more than 300 parts by weight, the resulting thermoplastic resin composition has reduced moldability and mechanical properties. The reinforcing agent and the filler may be used singly or in combination of two or more kinds.

The thermoplastic resin composition of the present invention may further contain, as necessary, at least one additive selected from oxidation inhibitors such as hindered phenols, hydroquinone, thioethers, phosphites, amines, derivatives thereof, copper compounds and the like; heat stabilizers of organotin type, lead type, metal soap type or the like; ultraviolet absorbers such as resorcinol, salicylates, benzotriazole, benzophenone and the like; releasing agents such as stearic acid, salts thereof, stearyl alcohol and the like; inorganic flame retardants such as red phosphorus, tin oxide, zirconium hydroxide, barium metaborate, aluminum hydroxide, magnesium hydroxide, calcium hydroxide, hydrotalcite and the like; organic flame retardants of halogen type, phosphoric acid ester type, melamine type or cyanuric acid type; auxiliary flame retardants such as antimony trioxide and the like; antistatic agents such as sodium dodecylbenzenesulfonate, polyalkylene glycol, alkyl betaine and the like; crystallization accelerators; dyes; pigments; and so forth.

The thermoplastic resin composition of the present invention may furthermore contain appropriate amounts of the following thermoplastic resin and the following thermosetting resin as long as the object of the present invention is not impaired. The thermoplastic resin includes polyethylene; ethylene-α-olefin copolymers having an ethylene content of 30–85 mole % (e.g. ethylene-propylene copolymer, ethylene-1-butene copolymer, ethylene-4-methyl-1-pentene copolymer and ethylene-1-octene copolymer); ethylene-vinyl acetate copolymer; ethylene-vinyl alcohol copolymer; vinyl compound polymers (e.g. polyvinyl acetate and polyvinyl chloride); polyolefins (e.g. poly-1-butene and poly-4-methyl-1-pentene); polyamide elastomers; thermoplastic polyesters (e.g. polyester elastomers, polyethylene terephthalate and polybutylene terephthalate); polycarbonates; polysulfone; polyphenylene sulfide; etc. The thermosetting resin includes phenolic resin, melamine resin, urea resin, silicone resin, epoxy resin, etc.

The thermoplastic resin composition of the present invention contains, besides the essential resin components (A), (B), (C), and (D) or (E), appropriate amounts of the above-mentioned other components (e.g. additives) added as necessary. In producing the composition, there is no particular restriction as to the addition order of the resin components and the other components. The resin components and the other components may be compounded simultaneously; or, two or three resin components may be compounded beforehand to prepare a mixture, after which this mixture may be compounded with the remaining resin component(s) and the other components; or, the resin components (A), (B), (C), and (D) or (E) may be compounded beforehand to prepare a mixture and this mixture may be compounded with the other components.

The thus-obtained thermoplastic resin composition of the present invention can be subjected to injection molding, compression molding, extrusion molding or the like to obtain a molded article to be used in various applications.

The present invention is hereinafter described in more detail by way of Examples and Comparative Examples. However, the present invention is in no way restricted to these Examples as long as the scope of the present invention is observed.

In the following Examples and Comparative Examples, the mechanical properties of each molded test piece were measured as follows.

(1) Injection pressure

An injection pressure was measured at the time when a test piece was prepared by injection molding.

(2) Izod impact strength (Izod)

Measured by ASTM D 256.

(3) Tensile properties (tensile strength and tensile elongation at break)

Measured by ASTM D 638.

(4) Flexural modulus

Measured by ASTM D 790.

(5) Water absorption (flexural modulus upon water absorption)

An ASTM No. 1 test piece (thickness: ⅛ inch) was prepared, allowed to stand in water of 23° C. for 24 hours, and measured for flexural modulus upon water absorption by ASTM D 790.

(6) Deflection temperature under load

Measured under a load of 4.6 kg/cm$^2$ by ASTM D 648.

In the thermoplastic resin compositions produced in the following Examples and Comparative Examples, the following raw materials were used.

(1) Polyamide resin [component (A)]

Nylon 66 (PA) having a number-average molecular weight of 15,000 was used.

(2) Modified polyphenylene ether [component (B)]

2.6-Xylenol was subjected to homopolymerization to obtain a polypheylene ether (PPE) having a relative viscosity of 0.45 as measured at 25° C. in a 0.5 wt. % chloroform solution. This PPE and maleic anhydride were melt-kneaded at 280° C. to obtain a maleic anhydride-modified polyphenylene ether (MAH-PPE). This MAH-PPE was measured for maleic anhydride content by infrared spectrophotometry using the calibration curve of infrared absorption spectrum beforehand prepared for maleic anhydride/PPE mixtures, and the maleic anhydride content in MAH-PPE was 0.2% by weight.

(3) Aromatic vinyl compound-aliphatic hydrocarbon copolymer [component (C)]

(a) Hydrogenated styrene-isoprene block copolymer

A SEPS triblock copolymer SEPTON 2023 (SEPS) manufactured by Kuraray Co., Ltd. was used.

(b) Styrene-butadiene triblock copolymer

TR 2400 (SBS) manufactured by Japan Synthetic Rubber Co., Ltd. was used.

(c) Hydrogenated styrene-butadiene triblock copolymer

Kraton G-1651 (SEBS) manufactured by Shell Japan Ltd. was used.

(d) Hydrogenated styrene-butadiene random copolymer DYNARON 1910P (H-SBR) manufactured by Japan Synthetic Rubber Co., Ltd. was used.

(4) Ethylene-α-olefin copolymer [component (D)]

There was used an ethylene-propylene random copolymer (EPR) having an MFR of 0.4 g/10 min as measured at 230° C. under a load of 2.16 kg.

(5) Maleic anhydride-modified ethylene-α-olefin copolymer [component (D)]

There was used a maleic anhydride-modified ethylene-propylene random copolymer (MAH-EPR) containing 0.1% by weight of maleic anhydride, which was obtained by melt-kneading the ethylene-propylene random copolymer of the above (4) with maleic anhydride in the presence of a radical initiator.

(6) Polypropylene resin [component (E)]

There was used a homopolypropylene (PP) having an MFR of 0.8 g/10 min as measured at 230° C. under a load of 2.16 kg.

(7) Maleic anhydride-modified polypropylene resin [component (E)]

There was used a maleic anhydride-modified polypropylene (MAH-PP) containing 0.1% by weight of maleic anhydride, which was obtained by melt-kneading the homopolypropylene of the above (6) with maleic anhydride in the presence of a radical initiator.

EXAMPLES 1–8

A polyamide resin [component (A)], a modified polyphenylene ether [component (B)], the following component (C), and the following component (D) or (E) were subjected to preliminary mixing in the proportions shown in Tables 1 and 2, using a tumbler. The component (C) was a hydrogenated styrene-isoprene block copolymer (hereinafter abbreviated to SEPS). The component (D) was an ethylene-propylene random copolymer (hereinafter abbreviated to EPR). The component (E) was a homopolypropylene (hereinafter abbreviated to PP).

Each of the resulting mixtures was fed into a twin-screw extruder (TEX 30 manufactured by The Japan Steel Works, Ltd.) and melt-kneaded at a cylinder temperature of 280° C. The molten resin extruded through the extruder die was placed in a water tank for cooling, and the cooled resin was pelletized using a strand cutter.

The thus-obtained pellets of thermoplastic resin composition were vacuum-dried at 120° C. for 8 hours and then made into test pieces using an injection molding machine (AUTOSHOT-C30A manufactured by FANUC Co.) under conditions of cylinder temperature=280° C., die temperature=80° C. and injection speed=100 mm/sec.

The test pieces were measured for mechanical properties. The formulations (components and proportions thereof) of each thermoplastic resin composition obtained above and the measurement results of the mechanical properties of each composition are shown in Tables 1 and 2.

In each Example, the pellets were observed using the photograph of transmission electron microscope. As a result, in each thermoplastic resin composition, the disperse phase consisted of core-shell structure complex grains.

TABLE 1

| | Example No. | | | |
|---|---|---|---|---|
| | Example 1 | Example 2 | Example 3 | Example 4 |
| Component (A) | | | | |
| PA*1 (parts by weight) | 50 | 50 | 50 | 50 |
| Component (B) | | | | |
| MAH-PPE*2 (parts by weight) | 20 | 20 | 30 | 10 |
| Component (C) | | | | |
| SEPS*3 (parts by weight) | 10 | 5 | 5 | 15 |
| SBS*4 (parts by weight) | | | | |
| SEBS*5 (parts by weight) | | | | |
| H-SBR*6 (parts by weight) | | | | |
| Component (D) | | | | |
| EPR*7 (parts by weight) | 20 | 25 | 15 | 25 |
| MAH-EPR*8 (parts by weight) | | | | |
| Injection pressure (Pa · s) | 71 | 75 | 105 | 68 |
| Izod (J/m) | 820 | 900 | 680 | 950 |
| Tensile strength (MPa) | 46 | 44 | 49 | 43 |
| Tensile elongation at break (%) | 100 | 130 | 120 | 100 |
| Flexural modulus (GPa) | 1.9 | 1.8 | 2.0 | 1.8 |
| Flexural modulus upon water absorption (GPa) | 1.6 | 1.6 | 1.7 | 1.6 |
| Deflection temperature under load (°C.) | 186 | 191 | 206 | 170 |

*1 PA refers to nylon 66.
*2 MAH-PPE refers to a maleic anhydride-modified polyphenylene ether.
*3 SEPS refers to a hydrogenated styrene-isoprene triblock copolymer.
*4 SBS refers to a styrene-butadiene triblock copolymer.
*5 SEBS refers to a hydrogenated styrene-butadiene triblock copolymer.
*6 H-SBR refers to a hydrogenated styrene-butadiene random copolymer.
*7 EPR refers to an ethylene-propylene random copolymer.
*8 MAH-EPR refers to a maleic anhydride-modified ethylene-propylene random copolymer.

TABLE 2

| | Example No. | | | |
|---|---|---|---|---|
| | Example 5 | Example 6 | Example 7 | Example 8 |
| Component (A) | | | | |
| PA*1 (parts by weight) | 50 | 50 | 50 | 50 |
| Component (B) | | | | |
| MAH-PPE*2 (parts by weight) | 20 | 20 | 30 | 10 |
| Component (C) | | | | |
| SEPS*3 (parts by weight) | 10 | 5 | 5 | 15 |
| SBS*4 (parts by weight) | | | | |
| SEBS*5 (parts by weight) | | | | |
| H-SBR*6 (parts by weight) | | | | |
| Component (E) | | | | |
| PP*7 (parts by weight) | 20 | 25 | 15 | 25 |
| MAH-PP*8 (parts by weight) | | | | |
| Injection pressure (Pa · s) | 70 | 72 | 102 | 65 |
| Izod (J/m) | 130 | 120 | 180 | 220 |
| Tensile strength (MPa) | 55 | 53 | 58 | 50 |
| Tensile elongation at | 150 | 120 | 140 | 120 |

TABLE 2-continued

|  | Example No. | | | |
| --- | --- | --- | --- | --- |
|  | Example 5 | Example 6 | Example 7 | Example 8 |
| break (%) | | | | |
| Flexural modulus (GPa) | 2.2 | 2.1 | 2.2 | 1.9 |
| Flexural modulus upon water absorption (GPa) | 1.9 | 1.8 | 1.9 | 1.7 |
| Deflection temperature under load (°C.) | 188 | 203 | 210 | 178 |

*1 PA refers to nylon 66.
*2 MAH-PPE refers to a maleic anhydride-modified polyphenylene ether.
*3 SEPS refers to a hydrogenated styrene-isoprene triblock copolymer.
*4 SBS refers to a styrene-butadiene triblock copolymer.
*5 SEBS refers to a hydrogenated styrene-butadiene triblock copolymer.
*6 H-SBR refers to a hydrogenated styrene-butadiene random copolymer.
*7 PP refers to an ethylene-propylene random copolymer.
*8 MAH-PP refers to a maleic anhydride-modified ethylene-propylene random copolymer.

Comparative Examples 1-8

The same procedure as in Examples 1-8 was used except that the component [D] was changed from EPR to a maleic anhydride-modified ethylene-propylene random copolymer (hereinafter abbreviated to MAH-EPR) and the component (E) was changed from PP to a maleic anhydride-modified polypropylene (hereinafter abbreviated to MAH-PP).

The formulations (components and proportions thereof) of each thermoplastic resin composition obtained and the measurement results of the mechanical properties of each composition are shown in Tables 3 and 4. Each thermoplastic resin composition, as compared with those of Examples 1-8, was remarkably inferior in Izod impact strength and flexural modulus upon water absorption.

In each Comparative Example, the pellets were observed using the photograph of transmission electron microscope. As a result, in each thermoplastic resin composition, the disperse phase formed substantially no core-shell structure grains.

TABLE 3

|  | Comparative Example No. | | | |
| --- | --- | --- | --- | --- |
|  | Comparative Example 1 | Comparative Example 2 | Comparative Example 3 | Comparative Example 4 |
| Component (A) | | | | |
| PA*1 (parts by weight) | 50 | 50 | 50 | 50 |
| Component (B) | | | | |
| MAH-PPE*2 (parts by weight) | 20 | 20 | 30 | 10 |
| Component (C) | | | | |
| SEPS*3 (parts by weight) | 10 | 5 | 5 | 15 |
| SBS*4 (parts by weight) | | | | |
| SEBS*5 (parts by weight) | | | | |
| H-SBR*6 (parts by weight) | | | | |
| Component (D) | | | | |
| EPR*7 (parts by weight) | 20 | 25 | 15 | 25 |
| MAH-EPR*8 (parts by weight) | | | | |
| Injection pressure (Pa · s) | 85 | 82 | 152 | 78 |

TABLE 3-continued

|  | Comparative Example No. | | | |
| --- | --- | --- | --- | --- |
|  | Comparative Example 1 | Comparative Example 2 | Comparative Example 3 | Comparative Example 4 |
| Izod (J/m) | 180 | 210 | 95 | 160 |
| Tensile strength (MPa) | 41 | 40 | 41 | 48 |
| Tensile elongation at break (%) | 28 | 20 | 25 | 30 |
| Flexural modulus (GPa) | 1.8 | 1.8 | 2.0 | 1.7 |
| Flexural modulus upon water absorption (GPa) | 1.2 | 1.4 | 1.5 | 1.3 |
| Deflection temperature under load (°C.) | 176 | 162 | 194 | 148 |

*1 PA refers to nylon 66.
*2 MAH-PPE refers to a maleic anhydride-modified polyphenylene ether.
*3 SEPS refers to a hydrogenated styrene-isoprene triblock copolymer.
*4 SBS refers to a styrene-butadiene triblock copolymer.
*5 SEBS refers to a hydrogenated styrene-butadiene triblock copolymer.
*6 H-SBR refers to a hydrogenated styrene-butadiene random copolymer.
*7 EPR refers to an ethylene-propylene random copolymer.
*8 MAH-EPR refers to a maleic anhydride-modified ethylene-propylene random copolymer.

TABLE 4

|  | Comparative Example No. | | | |
| --- | --- | --- | --- | --- |
|  | Comparative Example 5 | Comparative Example 6 | Comparative Example 7 | Comparative Example 8 |
| Component (A) | | | | |
| PA*1 (parts by weight) | 50 | 50 | 50 | 50 |
| Component (B) | | | | |
| MAH-PPE*2 (parts by weight) | 20 | 20 | 30 | 10 |
| Component (C) | | | | |
| SEPS*3 (parts by weight) | 10 | 5 | 5 | 15 |
| SBS*4 (parts by weight) | | | | |
| SEBS*5 (parts by weight) | | | | |
| H-SBR*6 (parts by weight) | | | | |
| Component (E) | | | | |
| PP*7 (parts by weight) | 20 | 25 | 15 | 25 |
| MAH-PP*8 (parts by weight) | | | | |
| Injection pressure (Pa · s) | 78 | 75 | 135 | 71 |
| Izod (J/m) | 55 | 51 | 52 | 120 |
| Tensile strength (MPa) | 48 | 40 | 43 | 48 |
| Tensile elongation at break (%) | 25 | 22 | 28 | 50 |
| Flexural modulus (GPa) | 2.1 | 2.1 | 2.1 | 1.8 |
| Flexural modulus upon water absorption (GPa) | 1.5 | 1.5 | 1.6 | 1.4 |
| Deflection temperature under load (°C.) | 175 | 162 | 195 | 151 |

*1 PA refers to nylon 66.
*2 MAH-PPE refers to a maleic anhydride-modified polyphenylene ether.
*3 SEPS refers to a hydrogenated styrene-isoprene triblock copolymer.
*4 SBS refers to a styrene-butadiene triblock copolymer.
*5 SEBS refers to a hydrogenated styrene-butadiene triblock copolymer.
*6 H-SBR refers to a hydrogenated styrene-butadiene random copolymer.
*7 PP refers to an ethylene-propylene random copolymer.
*8 MAH-PP refers to a maleic anhydride-modified ethylene-propylene random copolymer.

EXAMPLES 9-11

The same procedure as in Example 1 was used except that the component (C) was changed from SEPS to a styrenebutadiene triblock copolymer (SBS) (Example 9), a hydrogenated styrene-butadiene triblock copolymer (SEBS) (Example 10) and a hydrogenated styrene-butadiene random copolymer (H-SBR) (Example 11).

The formulations (components and proportions thereof) of each thermoplastic resin composition obtained and the measurement results of the mechanical properties of each composition are shown in Table 5.

In each Example, the pellets were observed using the photograph of transmission electron microscope. As a result, in each thermoplastic resin composition, the disperse phase consisted of core-shell structure complex grains.

Comparative Examples 9–11

The same procedure as in Examples 9–11 was used except that the component (D) was changed from EPR to MAH-EPR and the component (C) was the same between Example 9 and Comparative Example 9, between Example 10 and Comparative Example 10 and between Example 11 and Comparative Example 11.

The formulations (components and proportions thereof) of each thermoplastic resin composition obtained and the measurement results of the mechanical properties of each composition are shown in Table 5. Each thermoplastic resin composition, as compared with those of Examples 9–11, was remarkably inferior in Izod impact strength and flexural modulus upon water absorption.

In each Comparative Example, the pellets were observed using the photograph of transmission electron microscope. As a result, in each thermoplastic resin composition, the disperse phase formed substantially no core-shell structure grains.

EXAMPLES 12–14

The same procedure as in Example 5 was used except that the component (C) was changed from SEPS to SBS (Example 12), SEBS (Example 13) and H-SBR (Example 14).

The formulations (components and proportions thereof) of each thermoplastic resin composition obtained and the measurement results of the mechanical properties of each composition are shown in Table 6.

In each Example, the pellets were observed using the photograph of transmission electron microscope. As a result, in each thermoplastic resin composition, the disperse phase consisted of core-shell structure complex grains.

Comparative Examples 12–14

The same procedure as in Examples 12–14 was used except that the component (E) was changed from PP to MAH-PP and the component (C) was the same between Example 12 and Comparative Example 12, between Example 13 and Comparative Example 13 and between Example 14 and Comparative Example 14.

The formulations (components and proportions thereof) of each thermoplastic resin composition obtained and the measurement results of the mechanical properties of each composition are shown in Table 6. Each thermoplastic resin composition, as compared with those of Examples 12–14, was remarkably inferior in Izod impact strength and flexural modulus upon water absorption.

TABLE 5

| | | Example 9 | Example 10 | Example 11 | Comparative Example 9 | Comparative Example 10 | Comparative Example 11 |
|---|---|---|---|---|---|---|---|
| Component (A) | PA*1 (parts by weight) | 50 | 50 | 50 | 50 | 50 | 50 |
| Component (B) | MAH-PPE*2 (parts by weight) | 20 | 20 | 20 | 20 | 20 | 20 |
| Component (C) | SEPS*3 (parts by weight) | | | | | | |
| | SBS*4 (parts by weight) | 10 | | | 10 | | |
| | SEBS*5 (parts by weight) | | 10 | | | 10 | |
| | H-SBR*6 (parts by weight) | | | 10 | | | 10 |
| Component (D) | EPR*7 (parts by weight) | 20 | 20 | 20 | | | |
| | MAH-EPR*8 (parts by weight) | | | | 20 | 20 | 20 |
| Injection pressure (Pa · s) | | 72 | 74 | 70 | 78 | 82 | 81 |
| Izod (J/m) | | 850 | 910 | 900 | 250 | 230 | 280 |
| Tensile strength (MPa) | | 44 | 48 | 49 | 41 | 40 | 44 |
| Tensile elongation at break (%) | | 95 | 85 | 120 | 80 | 30 | 95 |
| Flexural modulus (GPa) | | 1.9 | 1.9 | 1.8 | 1.9 | 1.9 | 1.8 |
| Flexural modulus upon water absorption (GPa) | | 1.7 | 1.6 | 1.6 | 1.3 | 1.2 | 1.2 |
| Deflection temperature under load (°C.) | | 190 | 196 | 185 | 182 | 183 | 165 |

*1 PA refers to nylon 66.
*2 MAH-PPE refers to a maleic anhydride-modified polyphenylene ether.
*3 SEPS refers to a hydrogenated styrene-isoprene triblock copolymer.
*4 SBS refers to a styrene-butadiene triblock copolymer.
*5 SEBS refers to a hydrogenated styrene-butadiene triblock copolymer.
*6 H-SBR refers to a hydrogenated styrene-butadiene random copolymer.
*7 EPR refers to an ethylene-propylene random copolymer.
*8 MAH-EPR refers to a maleic anhydride-modified ethylene-propylene random copolymer.

In each Comparative Example, the pellets were observed using the photograph of transmission electron microscope. As a result, in each thermoplastic resin composition, the disperse phase formed substantially no core-shell structure grains.

TABLE 6

| | Example 12 | Example 13 | Example 14 | Comparative Example 12 | Comparative Example 13 | Comparative Example 14 |
|---|---|---|---|---|---|---|
| Component (A) PA*1 (parts by weight) | 50 | 50 | 50 | 50 | 50 | 50 |
| Component (B) MAH-PPE*2 (parts by weight) | 20 | 20 | 20 | 20 | 20 | 20 |
| Component (C) SEPS*3 (parts by weight) | | | | | | |
| SBS*4 (parts by weight) | 10 | | | 10 | | |
| SEBS*5 (parts by weight) | | 10 | | | 10 | |
| H-SBR*6 (parts by weight) | | | 10 | | | 10 |
| Component (E) PP*7 (parts by weight) | 20 | 20 | 20 | | | |
| MAH-PP*8 (parts by weight) | | | | 20 | 20 | 20 |
| Injection pressure (Pa · s) | 72 | 73 | 68 | 76 | 80 | 76 |
| Izod (J/m) | 135 | 110 | 180 | 110 | 85 | 120 |
| Tensile strength (MPa) | 54 | 58 | 57 | 48 | 58 | 57 |
| Tensile elongation at break (%) | 140 | 120 | 155 | 35 | 25 | 60 |
| Flexural modulus (GPa) | 2.2 | 2.2 | 2.0 | 2.1 | 2.2 | 1.8 |
| Flexural modulus upon water absorption (GPa) | 1.9 | 1.9 | 1.9 | 1.6 | 1.6 | 1.5 |
| Deflection temperature under load (°C.) | 195 | 198 | 186 | 187 | 198 | 160 |

*1 PA refers to nylon 66.
*2 MAH-PPE refers to a maleic anhydride-modified polyphenylene ether.
*3 SEPS refers to a hydrogenated styrene-isoprene triblock copolymer.
*4 SBS refers to a styrene-butadiene triblock copolymer.
*5 SEBS refers to a hydrogenated styrene-butadiene triblock copolymer.
*6 H-SBR refers to a hydrogenated styrene-butadiene random copolymer.
*7 PP refers to a homopolypropylene.
*8 MAH-PP refers to a maleic anhydride-modified polypropylene.

EXAMPLE 15

The same procedure as in Example 1 was used except that the amount of the component (A) was changed from 50 parts by weight to 60 parts by weight and the amount of the component (D) was changed form 20 parts by weight to 10 parts by weight.

The formulation (components and proportions thereof) of the thermoplastic resin composition obtained and the measurement results of the mechanical properties of the composition are shown in Table 7.

The pellets of the thermoplastic resin composition were observed using the photograph of transmission electron microscope. As a result, in the thermoplastic resin composition, the disperse phase consisted of core-shell structure complex grains.

EXAMPLE 16

The same procedure as in Example 1 was used except that the amount of the component (A) was changed from 50 parts by weight to 40 parts by weight, the amount of the component (B) was changed from 20 parts by weight to 25 parts by weight, the amount of the component (C) was changed from 10 parts by weight to 20 parts by weight, and the amount of the component (D) was changed from 20 parts by weight to 15 parts by weight.

The formulation (components and proportions thereof) of the thermoplastic resin composition obtained and the measurement results of the mechanical properties of the composition are shown in Table 7.

The pellets of the thermoplastic resin composition were observed using the photograph of transmission electron microscope. As a result, in the thermoplastic resin composition, the disperse phase consisted of core-shell structure complex grains.

Comparative Examples 15–16

Comparative Example 15 was conducted using the same procedure as in Example 15 except that the component (D) was changed from EPR to MAH-EPR. Comparative Example 16 was conducted using the same procedure as in Example 16 except that the component (D) was changed from EPR to MAH-EPR.

The formulations (components and proportions thereof) of each thermoplastic resin composition obtained and the measurement results of the mechanical properties of each composition are shown in Table 7. Each thermoplastic resin composition, as compared with those of Examples 15–16, was considerably inferior in Izod impact strength and flexural modulus upon water absorption.

In each Comparative Example, the pellets were observed using the photograph of transmission electron microscope. As a result, in each thermoplastic resin composition, the disperse phase formed substantially no core-shell structure grains.

Comparative Example 17

The same procedure as in Example 1 was used except that the amount of the component (B) was changed from 20 parts by weight to 25 parts by weight, no component (C) was used, and the amount of the component (D) was changed from 20 parts by weight to 25 parts by weight.

The formulations (components and proportions thereof) of the thermoplastic resin composition obtained and the measurement results of the mechanical properties of the composition are shown in Table 7. The thermoplastic resin composition, as compared with that of Example 1, was remarkably inferior in Izod impact strength and flexural modulus upon water absorption.

The pellets of the thermoplastic resin composition were observed using the photograph of transmission electron microscope. As a result, in the thermoplastic resin composition, the disperse phase formed substantially no core-shell structure grains.

Comparative Example 18

The same procedure as in Example 1 was used except that the amount of the component (B) was changed from 20 parts by weight to 40 parts by weight and no component (D) was used.

The formulations (components and proportions thereof) of the thermoplastic resin composition obtained and the measurement results of the mechanical properties of the composition are shown in Table 7. The thermoplastic resin composition, as compared with that of Example 1, was remarkably inferior in Izod impact strength and flexural modulus upon water absorption.

The pellets of the thermoplastic resin composition were observed using the photograph of transmission electron microscope. As a result, in the thermoplastic resin composition, the disperse phase formed substantially no core-shell structure grains.

EXAMPLE 18

The same procedure as in Example 5 was used except that the amount of the component (A) was changed from 50 parts by weight to 40 parts by weight, the amount of the component (B) was changed from 20 parts by weight to 25 parts by weight, the amount of the component (C) was changed from 10 parts by weight to 20 parts by weight, and the amount of the component (E) was changed from 20 parts by weight to 15 parts by weight.

The formulation (components and proportions thereof) of the thermoplastic resin composition obtained and the measurement results of the mechanical properties of the composition are shown in Table 8.

The pellets of the thermoplastic resin composition were observed using the photograph of transmission electron microscope. As a result, in the thermoplastic resin composition, the disperse phase consisted of core-shell structure complex grains.

Comparative Examples 19–20

Comparative Example 19 was conducted using the same procedure as in Example 17 except that the component (E) was changed from PP to MAH-PP. Comparative Example 20

TABLE 7

| | | Example 15 | Example 16 | Comparative Example 15 | Comparative Example 16 | Comparative Example 17 | Comparative Example 18 |
|---|---|---|---|---|---|---|---|
| Component (A) | PA*1 (parts by weight) | 60 | 40 | 60 | 40 | 50 | 50 |
| Component (B) | MAH-PPE*2 (parts by weight) | 20 | 25 | 20 | 25 | 20 | 40 |
| Component (C) | SEPS*3 (parts by weight) | 10 | 20 | 10 | 20 | | 10 |
| | SBS*4 (parts by weight) | | | | | | |
| | SEBS*5 (parts by weight) | | | | | | |
| | H-SBR*6 (parts by weight) | | | | | | |
| Component (D) | EPR*7 (parts by weight) | 10 | 15 | | | 25 | |
| | MAH-EPR*8 (parts by weight) | | | 10 | 15 | | |
| Injection pressure (Pa · s) | | 80 | 76 | 85 | 77 | 95 | 180 |
| Izod (J/m) | | 320 | 860 | 180 | 260 | 260 | 150 |
| Tensile strength (MPa) | | 58 | 41 | 50 | 40 | 43 | 58 |
| Tensile elongation at break (%) | | 150 | 120 | 45 | 25 | 35 | 50 |
| Flexural modulus (GPa) | | 2.2 | 1.8 | 2.2 | 1.8 | 1.8 | 2.2 |
| Flexural modulus upon water absorption (GPa) | | 1.8 | 1.6 | 1.5 | 1.4 | 1.2 | 1.6 |
| Deflection temperature under load (°C.) | | 212 | 178 | 210 | 173 | 168 | 213 |

*1 PA refers to nylon 66.
*2 MAH-PPE refers to a maleic anhydride-modified polyphenylene ether.
*3 SEPS refers to a hydrogenated styrene-isoprene triblock copolymer.
*4 SBS refers to a styrene-butadiene triblock copolymer.
*5 SEBS refers to a hydrogenated styrene-butadiene triblock copolymer.
*6 H-SBR refers to a hydrogenated styrene-butadiene random copolymer.
*7 EPR refers to an ethylene-propylene random copolymer.
*8 MAH-EPR refers to a maleic anhydride-modified ethylene-propylene random copolymer.

EXAMPLE 17

The same procedure as in Example 5 was used except that the amount of the component (A) was changed from 50 parts by weight to 60 parts by weight and the amount of the component (E) was changed from 20 parts by weight to 10 parts by weight.

The formulation (components and proportions thereof) of the thermoplastic resin composition obtained and the measurement results of the mechanical properties of the composition are shown in Table 8.

The pellets of the thermoplastic resin composition were observed using the photograph of transmission electron microscope. As a result, in the thermoplastic resin composition, the disperse phase consisted of core-shell structure complex grains.

was conducted using the same procedure as in Example 18 except that the component (E) was changed from PP to MAH-PP.

The formulations (components and proportions thereof) of each thermoplastic resin composition obtained and the measurement results of the mechanical properties of each composition are shown in Table 8. Each thermoplastic resin composition, as compared with those of Examples 17–18, was considerably inferior in Izod impact strength and flexural modulus upon water absorption.

In each Comparative Example, the pellets were observed using the photograph of transmission electron microscope. As a result, in each thermoplastic resin composition, the disperse phase formed substantially no core-shell structure grains.

Comparative Example 21

The same procedure as in Example 5 was used except that the amount of the component (B) was changed from 20 parts by weight to 25 parts by weight, no component (C) was used, and the amount of the component (E) was changed from 20 parts by weight to 25 parts by weight.

The formulations (components and proportions thereof) of the thermoplastic resin composition obtained and the measurement results of the mechanical properties of the composition are shown in Table 8. The thermoplastic resin composition, as compared with that of Example 5, was remarkably inferior in Izod impact strength and flexural modulus upon water absorption.

The pellets of the thermoplastic resin composition were observed using the photograph of transmission electron microscope. As a result, in the thermoplastic resin composition, the disperse phase formed substantially no core-shell structure grains.

Comparative Example 22

The same procedure as in Example 5 was used except that the amount of the component (B) was changed from 20 parts by weight to 40 parts by weight and no component (E) was used.

The formulations (components and proportions thereof) of the thermoplastic resin composition obtained and the measurement results of the mechanical properties of the composition are shown in Table 8. The thermoplastic resin composition, as compared with that of Example 5, was remarkably inferior in tensile elongation at break and flexural modulus upon water absorption.

The pellets of the thermoplastic resin composition were observed using the photograph of transmission electron microscope. As a result, in the thermoplastic resin composition, the disperse phase formed substantially no core-shell structure grains.

What is claimed is:

1. A thermoplastic resin composition comprising:
   40–75 parts by weight of a polyamide resin (A),
   5–30 parts by weight of a modified polyphenylene ether (B) which is a polyphenylene ether modified with an α,β-unsaturated carboxylic acid or a derivative thereof,
   1–30 parts by weight of an aromatic vinyl compound-aliphatic hydrocarbon copolymer (C), and
   1–30 parts by weight of a copolymer of ethylene with an α-olefin of 3 or more carbon atoms (D): with the total amount of the components (A), (B), (C) and (D) being 100 parts by weight, wherein the component (A) is present as a matrix phase and the other components (B), (C) and (D) are present as a disperse phase consisting of core-shell structure grains, in each of which grains the modified polyphenylene ether (B) forms a shell phase, the aromatic vinyl compound-aliphatic hydrocarbon copolymer (C) forms an intermediate phase and the copolymer of ethylene with the α-olefin (D) forms a core phase.

2. A thermoplastic resin composition comprising:
   40–75 parts by weight of a polyamide resin (A),
   5–30 parts by weight of a modified polyphenylene ether (B) which is a polyphenylene ether modified with an α,β-unsaturated carboxylic acid or a derivative thereof,
   1–30 parts by weight of an aromatic vinyl compound-aliphatic hydrocarbon copolymer (C), and
   1–30 parts by weight of a polypropylene resin (E) with the total amount of the components (A), (B), (C) and (E) being 100 parts by weight, wherein the component (A) is present as a matrix phase and the other components (B), (C) and (E) are present as a disperse phase consisting of core-shell structure grains, in each of which grains the modified polyphenylene ether (B) forms a shell phase, the aromatic vinyl compound-aliphatic hydrocarbon copolymer (C) forms an intermediate phase and the polypropylene resin (E) forms a core phase.

TABLE 8

| | | | Example 17 | Example 18 | Comparative Example 19 | Comparative Example 20 | Comparative Example 21 | Comparative Example 22 |
|---|---|---|---|---|---|---|---|---|
| Component (A) | PA*1 (parts by weight) | | 60 | 40 | 60 | 40 | 50 | 50 |
| Component (B) | MAH-PPE*2 (parts by weight) | | 20 | 25 | 20 | 25 | 25 | 40 |
| Component (C) | SEPS*3 (parts by weight) | | 10 | 20 | 10 | 20 | | 10 |
| | SBS*4 (parts by weight) | | | | | | | |
| | SEBS*5 (parts by weight) | | | | | | | |
| | H-SBR*6 (parts by weight) | | | | | | 25 | |
| Component (E) | PP*7 (parts by weight) | | 10 | 15 | | | 25 | |
| | MAH-PP*8 (parts by weight) | | | | 10 | 15 | | |
| Injection pressure (Pa · s) | | | 78 | 70 | 85 | 75 | 75 | 180 |
| Izod (J/m) | | | 120 | 120 | 70 | 80 | 60 | 150 |
| Tensile strength (MPa) | | | 60 | 50 | 58 | 45 | 46 | 58 |
| Tensile elongation at break (%) | | | 110 | 100 | 40 | 30 | 30 | 50 |
| Flexural modulus (GPa) | | | 2.3 | 1.9 | 2.3 | 1.9 | 2.1 | 2.2 |
| Flexural modulus upon water absorption (GPa) | | | 1.8 | 1.7 | 1.5 | 1.5 | 1.5 | 1.6 |
| Deflection temperature under load (°C.) | | | 216 | 181 | 210 | 175 | 175 | 213 |

*1 PA refers to nylon 66.
*2 MAH-PPE refers to a maleic anhydride-modified polyphenylene ether.
*3 SEPS refers to a hydrogenated styrene-isoprene triblock copolymer.
*4 SBS refers to a styrene-butadiene triblock copolymer.
*5 SEBS refers to a hydrogenated styrene-butadiene triblock copolymer.
*6 H-SBR refers to a hydrogenated styrene-butadiene random copolymer.
*7 PP refers to a homopolypropylene.
*8 MAH-PP refers to a maleic anhydride-modified polypropylene.

3. A thermoplastic resin composition according to claim 1 or 2, wherein the aromatic vinyl compound-aliphatic hydrocarbon copolymer (C) is a hydrogenated or non-hydrogenated styrene-butadiene copolymer.

4. A thermoplastic resin composition according to claim 1 or 2, wherein the aromatic vinyl compound-aliphatic hydrocarbon copolymer (C) is a hydrogenated or non-hydrogenated styrene-isoprene copolymer.

5. A thermoplastic resin composition according to claim 1 or 2, wherein the polyamide resin (A) has a number-average molecular weight of 10,000–50,000.

6. A thermoplastic resin composition according to claim 1 or 2, wherein the modified polyphenylene ether (B) has an intrinsic viscosity of 0.2–1.0 dl/g as measured at 25° C. in chloroform.

7. A thermoplastic resin composition according to claim 1 or 2, wherein the aromatic vinyl compound-aliphatic hydrocarbon copolymer (C) has a number-average molecular weight of 20,000–250,000.

8. A thermoplastic resin composition according to claim 1, wherein the ethylene-α-olefin copolymer (D) has an ethylene content of 30–85 mole %.

9. A thermoplastic resin composition according to claim 2, wherein the polypropylene resin (E) has a melt flow rate of 0.3–150 g/10 min as measured at 230° C. under a load of 2.16 kg according to ASTM D 1238.

* * * * *